(12) United States Patent
Zhang et al.

(10) Patent No.: US 12,549,656 B2
(45) Date of Patent: Feb. 10, 2026

(54) METHOD, APPARATUS AND DEVICE FOR IDENTIFYING WATER INGRESS RISK OF TERMINAL, AND STORAGE MEDIUM

(71) Applicant: DRNC HOLDINGS, INC., Wilmington, DE (US)

(72) Inventors: Xiaoliang Zhang, Shenzhen (CN); Yigang Feng, Shenzhen (CN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/288,961

(22) PCT Filed: Apr. 13, 2022

(86) PCT No.: PCT/CN2022/086695
§ 371 (c)(1),
(2) Date: Oct. 30, 2023

(87) PCT Pub. No.: WO2022/257595
PCT Pub. Date: Dec. 15, 2022

(65) Prior Publication Data
US 2024/0205321 A1    Jun. 20, 2024

(30) Foreign Application Priority Data
Jun. 9, 2021 (CN) .......................... 202110645969.4

(51) Int. Cl.
*H04M 1/18* (2006.01)
*G06F 3/044* (2006.01)

(52) U.S. Cl.
CPC .............. *H04M 1/18* (2013.01); *G06F 3/044* (2013.01)

(58) Field of Classification Search
CPC ...... G06F 3/044; G06F 3/0412; G06F 3/0416; G06F 3/0418; G06F 3/04186;
(Continued)

(56) References Cited

U.S. PATENT DOCUMENTS 9,001,080 B2 *  4/2015  Okayama ............ G06F 3/04182
                                                      345/174
9,800,713 B2 * 10/2017  Dempster ............... G01F 23/00
(Continued)

FOREIGN PATENT DOCUMENTS

CN          103366138 A      10/2013
CN          104156120 A      11/2014
(Continued)

OTHER PUBLICATIONS

International Search Report for corresponding application PCT/CN2022/086695 filed Apr. 13, 2022: mail date Jul. 6, 2022.
(Continued)

*Primary Examiner* — Nitin Patel
*Assistant Examiner* — Amen W Bogale
(74) *Attorney, Agent, or Firm* — Volpe Koenig

(57) ABSTRACT

A method and apparatus for identifying a water ingress risk of a terminal, a device and a storage medium are provided. The method includes: respectively acquiring a first variation amount of a capacitance signal of a capacitive touch screen caused by connection between a ground wire on the surface of a housing of a smart terminal and a chip ground of a capacitive touch screen chip of the smart terminal, and a second variation amount of the capacitance signal of the capacitive touch screen caused by disconnection between the ground wire on the surface of the housing and the chip ground of the capacitive touch screen chip; and identifying a water ingress risk of the smart terminal according to the acquired first variation amount of the capacitance signal and the acquired second variation amount of the capacitance signal.

13 Claims, 3 Drawing Sheets

(58) Field of Classification Search
CPC . G06F 2203/04107; G06F 2203/04108; G01R 27/2605; G01R 29/12; G01R 29/24; H03K 2217/960765; H03K 2217/9607; H03K 2217/960705; H03K 2217/96071; H03K 2217/960715; H03K 2217/960755; H03K 2217/960775; H03K 2217/96078; H03K 2017/9602; H03K 2017/9604; H03K 2017/9606; H03K 2017/9609; H03K 2017/9613; H03K 2017/9615; H03K 2017/9618; H03K 2017/9622; H03K 2017/960765; H03K 2017/9607; H03K 2017/960705; H03K 2017/96071; H03K 2017/960715; H03K 2017/960755; H03K 2017/960775; H03K 2017/96078; H03K 17/945; H03K 17/96; H03K 17/955; H03K 17/962; H03K 17/9622; H04M 1/18; H04M 1/72454; H04M 2250/22

See application file for complete search history.

(56) References Cited

U.S. PATENT DOCUMENTS

| | | | | |
|---|---|---|---|---|
| 10,146,390 | B1* | 12/2018 | Ogirko | G06F 3/0416 |
| 11,543,908 | B1* | 1/2023 | Healy | G01R 27/2605 |
| 2008/0136792 | A1* | 6/2008 | Peng | G06F 3/04186 |
| | | | | 345/174 |
| 2014/0022207 | A1* | 1/2014 | Shimizu | G06F 3/044 |
| | | | | 345/174 |
| 2014/0253150 | A1* | 9/2014 | Menzel | G01R 27/2605 |
| | | | | 324/694 |
| 2016/0087629 | A1* | 3/2016 | Nishiyama | H03K 17/955 |
| | | | | 200/17 R |
| 2019/0121461 | A1* | 4/2019 | Recio | H03K 17/9622 |
| 2019/0227669 | A1* | 7/2019 | Maharyta | G06F 3/0448 |
| 2021/0123270 | A1* | 4/2021 | Spick | E05B 81/76 |
| 2022/0094360 | A1* | 3/2022 | Hüttenhofer | H03K 17/962 |
| 2022/0147181 | A1* | 5/2022 | Cleary | G06F 3/044 |

FOREIGN PATENT DOCUMENTS

| | | |
|---|---|---|
| CN | 105677130 A | 6/2016 |
| CN | 109407871 A | 3/2019 |
| EP | 2464099 A2 | 6/2012 |
| EP | 2996351 A1 | 3/2016 |
| TW | 202045958 A | 12/2020 |

OTHER PUBLICATIONS

European Search Report for corresponding application EP22819198; Report dated Sep. 10, 2024.

* cited by examiner

Fig. 1

Respectively acquire a first variation amount of a capacitance signal of a capacitive touch screen caused by connection between a ground wire on the surface of a housing of a smart terminal and a chip ground of a capacitive touch screen chip of the smart terminal, and a second variation amount of the capacitance signal of the capacitive touch screen caused by disconnection between the ground wire on the surface of the housing and the chip ground of the capacitive touch screen chip — S101

Identify a water ingress risk of the smart terminal according to the acquired first variation amount of the capacitance signal and the acquired second variation amount of the capacitance signal — S102

Fig. 2

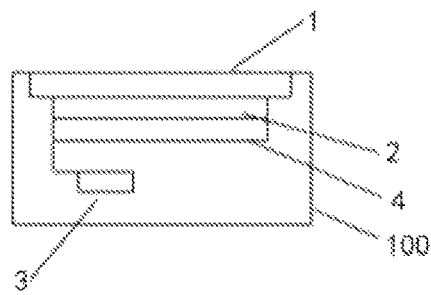

Fig. 3

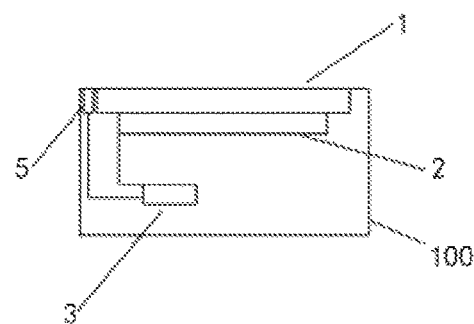

METHOD, APPARATUS AND DEVICE FOR IDENTIFYING WATER INGRESS RISK OF TERMINAL, AND STORAGE MEDIUM

CROSS-REFERENCE TO RELATED DISCLOSURE

The present application is a National Stage Filing of the PCT International Application No. PCT/CN2022/086695 filed on Apr. 13, 2022, which claims priority to Chinese Patent Application No. 202110645969.4 filed on Jun. 9, 2021 and entitled "Method. Apparatus and Device for Identifying Water Ingress Risk of Terminal, and Storage Medium", which is incorporated herein by reference in its entirety.

TECHNICAL FIELD

The present disclosure relates to the field of terminals, and in particular, to a method, an apparatus and a device for identifying a water ingress risk of a terminal, and a storage medium.

BACKGROUND

Smart terminals, such as mobile phones and watches, have higher and higher requirements for waterproofing.

A mobile phone is usually charged via a Universal Serial Bus (USB). Therefore, it is feasible to detect whether two different metal pins are short-circuited, and if short-circuited, it indicates that water intrudes into the interior of the USB. In this case, a USB connection may be physically disconnected to protect the USB from being burnt out due to the short-circuiting between the metal pins. However, a watch is generally not charged via a USB, and even if a USB port is used for charging, the USB port will be protected on the housing of the watch, but the requirements on the provision of protection for the USB port on the housing definitely increases the design difficulty.

Waterproofing of a watch is mainly achieved by sealing a housing of the watch. For example, a waterproofing grade of the watch may be increased by adding a waterproof silicone ring or the like to a gap on the housing of the watch, so that water cannot enter the interior of the housing, thereby avoiding damage of the watch caused by short-circuit of components on a main board. This method increases the design and assembly difficulty of the terminal, increases the cost of the terminal, and reduces the aesthetic appearance.

In addition, a smart terminal such as a mobile phone has a large volume, and under the condition that the terminal is subjected to an external force, the terminal may have large bending deformation, causing glue used at the gaps of the terminal to fall off, which reduces the sealing performance of the housing of the terminal. In such a case, water easily intrudes into the interior of the terminal, thereby causing a short circuit of components on a main board, and increasing a water ingress risk of the terminal.

SUMMARY

Embodiments of the present disclosure provide a method and apparatus for identifying a water ingress risk of a terminal, a device and a storage medium.

The embodiments of the present disclosure provide a method for identifying a water ingress risk of a terminal, the method including the following operations: a first variation amount of a capacitance signal of a capacitive touch screen caused by connection between a ground wire on the surface of a housing of a smart terminal and a chip ground of a capacitive touch screen chip of the smart terminal, and a second variation amount of the capacitance signal of the capacitive touch screen caused by disconnection between the ground wire on the surface of the housing and the chip ground of the capacitive touch screen chip are respectively acquired; and a water ingress risk of the smart terminal is identified according to the acquired first variation amount of the capacitance signal and the acquired second variation amount of the capacitance signal.

The embodiments of the present disclosure further provide an apparatus for identifying a water ingress risk of a terminal, the apparatus including: a signal acquisition module, configured to respectively acquire a first variation amount of a capacitance signal of a capacitive touch screen caused by connection between a ground wire on the surface of a housing of a smart terminal and a chip ground of a capacitive touch screen chip of the smart terminal, and a second variation amount of the capacitance signal of the capacitive touch screen caused by disconnection between the ground wire on the surface of the housing and the chip ground of the capacitive touch screen chip; and a risk identification module, configured to identify a water ingress risk of the smart terminal according to the acquired first variation amount of the capacitance signal and the acquired second variation amount of the capacitance signal.

The embodiments of the present disclosure further provide a device for identifying a water ingress risk of a terminal, the device including a memory and a processor; wherein the memory stores a program running on the processor, and the processor is configured to implement the operations of the method for identifying the water ingress risk of the terminal.

The embodiments of the present disclosure further provide a storage medium, the storage medium storing one or more programs; wherein the one or more programs, when being executed by a processor, cause the processor to implement the operations of the method for identifying the water ingress risk of the terminal.

BRIEF DESCRIPTION OF THE DRAWINGS

FIG. 1 is a flowchart of a method for identifying a water ingress risk of a terminal provided according to the embodiments of the present disclosure;

FIG. 2 is a schematic structural diagram of a watch in the related art;

FIG. 3 is a first schematic structural diagram of a watch provided according to the embodiments of the present disclosure;

DETAILED DESCRIPTION

Figure 4:
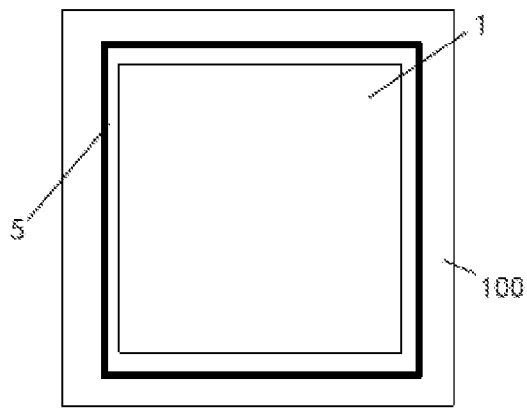
FIG. 4 is a second schematic structural diagram of a watch provided according to the embodiments of the present disclosure.

It should be understood that the exemplary embodiments described herein are only used to explain the present disclosure, and are not intended to limit the present disclosure.

In the following description, the use of a suffix such as "module", "component", or "unit" for denoting an element is merely for convenience of description of the embodiments of the present disclosure, and has no special meaning per se. Thus, "module", "component", or "unit" may be used in a mixed manner.

FIG. 1 is a flowchart of a method for identifying a water ingress risk of a terminal provided according to the embodiments of the present disclosure. As shown in FIG. 1, the method includes the following operations S101 and S102.

At operation S101, a first variation amount of a capacitance signal of a capacitive touch screen caused by connection between a ground wire on the surface of a housing of a smart terminal and a chip ground of a capacitive touch screen chip of the smart terminal, and a second variation amount of the capacitance signal of the capacitive touch screen caused by disconnection between the ground wire on the surface of the housing and the chip ground of the capacitive touch screen chip are respectively acquired.

The ground wire on the surface of the housing is connected to and disconnected from the chip ground of the capacitive touch screen chip within a preset time interval. For example, the ground wire on the surface of the housing is connected to the chip ground of the capacitive touch screen chip, and a first variation amount of the capacitance signal of the capacitive touch screen caused by connection between the ground wire on the surface of the housing and the chip ground of the capacitive touch screen chip is acquired; and within a preset time interval after the ground wire on the surface of the housing is connected to the chip ground of the capacitive touch screen chip, the ground wire on the surface of the housing is disconnected from the chip ground of the capacitive touch screen chip, and a second variation amount of the capacitance signal of the capacitive touch screen caused by disconnection between the ground wire on the surface of the housing and the chip ground of the capacitive touch screen chip is acquired. That is to say, within a preset time interval, for example, within 0.02 s, the ground wire on the surface of the housing and the chip ground of the capacitive touch screen chip are connected and disconnected once, so as to obtain the first variation amount of the capacitance signal and the second variation amount of the capacitance signal.

At operation S102, a water ingress risk of the smart terminal is identified according to the acquired first variation amount of the capacitance signal and the acquired second variation amount of the capacitance signal.

For example, it is determined whether the first variation amount of the capacitance signal is within a first threshold interval or a second threshold interval; it is determined whether the second variation amount of the capacitance signal is within the first threshold interval or the second threshold interval; in response to determining that the first variation amount of the capacitance signal is within the first threshold interval and the second variation amount of the capacitance signal is within the second threshold interval, it is determined that there is water on the surface of the capacitive touch screen, and it is identified that the smart terminal has the water ingress risk; and in response to determining that both the first variation amount of the capacitance signal and the second variation amount of the capacitance signal are within the first threshold interval, it is determined that there is no water on the surface of the capacitive touch screen, for example, a hand may be placed on the capacitive touch screen, and it is identified that the smart terminal has no water ingress risk. The variation amounts of the capacitance signal within the first threshold interval are all greater than the variation amounts of the capacitance signal within the second threshold interval.

In some exemplary implementations, under the condition that the smart terminal has the water ingress risk, the method further includes: an alert or an alarm is sent to other devices capable of communicating with the smart terminal by means of vibration, ringing, voice broadcast, screen display, etc., so as to remind the user to wipe off water on the surface of the housing and/or move the smart terminal away from a water source; moreover, the occurrence time and duration of the water ingress risk of the smart terminal can also be recorded, or the occurrence time and duration are sent to other devices capable of communicating with the smart terminal for recording.

The ground wire on the surface of the housing is provided at a position close to the glass cover plate on the surface of the housing of the smart terminal. For example, a closed or non-closed ground wire is provided along an edge of the glass cover plate. Under the condition of providing the non-closed ground wire, the non-closed ground wire may be provided correspondingly according to places where water ingress easily occurs at the edge of the glass cover plate.

The chip ground of the capacitive touch screen chip may be a grounding pin of the capacitive touch screen chip, and may alternatively be a grounding wire led out from a grounding pin of the capacitive touch screen chip. The chip ground of the capacitive touch screen chip may be connected to a ground wire on the surface of the housing through a switch device.

The technical solution provided in the embodiments of the present disclosure can utilize existing components on the smart terminal to identify and determine whether there is water on the surface of the display screen of the smart terminal by a software function. Under the condition of identifying that there is water on the surface of the display screen, the user is reminded in different manners, so that the user can move the smart terminal away from an environment with water as quickly as possible, thereby reducing the water ingress risk of the smart terminal.

The smart terminal above may be a watch (including a children's watch and a wearable adult watch), a mobile phone (including a children's mobile phone), a wristband, or the like.

Smart terminals such as a children's watch and a mobile phone usually include a capacitive touch screen sensor, a capacitive touch screen chip, a display screen, etc., for touch and display, and also include a smart operating system for performing a human-machine interaction operation. Hereinafter, a children's watch is taken as an example for detailed description.

A children's watch is a portable smart terminal that integrates multiple functions such as calling, positioning, electronic fence and emergency calling, and gradually has more and more functions such as video calling, music playback, video watching and gaming along with the development of smart functions. At present, a children's watch 100 generally includes a glass cover plate 1, a capacitive touch screen sensor 2, a capacitive touch screen chip 3, a display screen 4, etc., for touch and display, as shown in FIG. 2. The children's watch 100 uses a smart operating system to perform a human-machine interaction operation.

Under the condition that a child wears a children's watch, he/she usually cannot protect the watch well. However, as an electronic product, a waterproofing function of the children's watch is very important. Once water enters the interior of the watch, a short circuit of components on a main board may occur, so that the components may be damaged, and finally the watch may be damaged. Generally, the children's watch has a waterproofing design, but with the elapse of use time, the waterproofing effect gradually deteriorates, and it is difficult to avoid the situation that water enters the interior of the watch. If a child cannot identify the harm of water to the watch in a use environment when using the watch, the watch may be surrounded by water for a long time, thereby sharply increasing the water ingress risk of the watch.

Regarding the solutions of waterproofing designs of children's watches, on the one hand, the waterproofing capability of the children's watch itself needs to be improved, so that water cannot enter the interior of the terminal; and on the other hand, the waterproofing awareness of the children also needs to be improved, reducing the entry of the watch into an environment with water around, such that the watch is always in a dry environment, which can greatly reduce the water ingress risk of the watch.

The capacitive touch screen is located below the glass cover plate, and uses an Indium Tin metal Oxide (ITO) layer as a conductive layer. Electrodes are led out respectively in a transverse direction and a longitudinal direction of the capacitive touch screen, and under the condition that a user touches the capacitive touch screen, a coupling capacitor is formed between a finger of the user and the ITO electrodes, and the touch of the finger changes the original capacitance field distribution; therefore, whether a finger touches the screen can be identified by detecting the variation amount of the signal of transverse and longitudinal electrodes. Under the condition that a finger touch and a water drop occur on the glass cover plate on the surface of the watch, the capacitance signal amount will change, but the capacitance signal amounts under the condition that a finger touch and a water drop occur on the glass cover plate are different, and by means of this difference, it can be preliminarily determined whether there is a finger touch or a water drop on the surface of the glass cover plate. However, under the condition that the finger is away from the glass cover plate, for example, under the condition that the finger is at a certain distance from the glass cover plate, the variation amount of the capacitance signal corresponding to the finger is close to the variation amount of the capacitance signal corresponding to the water drop, and in such a case, it cannot be determined whether it is a water drop or a finger. Therefore, in the embodiments of the present disclosure, by grounding the water drop, the variation amount of the capacitance signal generated by the water drop is sharply increased to be close to or the same as that under the condition that the finger touches the glass cover plate, so that it can be identified whether there is a water drop or a finger on the glass cover plate.

Figure 5:
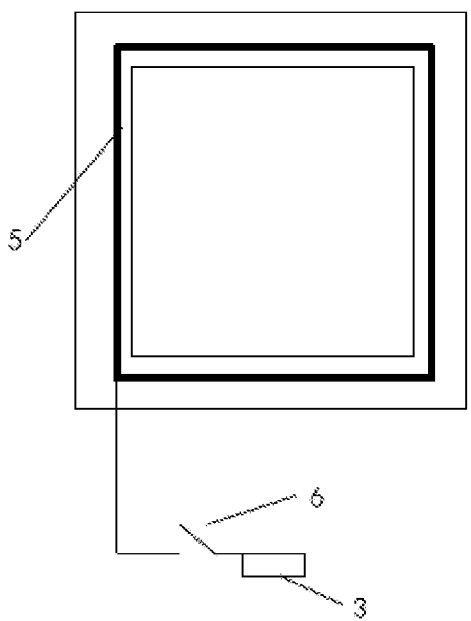
FIG. 5 is a third schematic structural diagram of a watch provided according to the embodiments of the present disclosure.

As shown in FIG. 2, the capacitive touch screen sensor 2 for human-machine interaction in smart terminals such as a children's watch and a mobile phone is mounted above the display screen 4, and is used for collecting a capacitance signal. Under the condition that a finger touches the glass cover plate 1 above the capacitive touch screen sensor 2, sensors in a transverse direction and a longitudinal direction on the capacitive touch screen sensor 2 respectively collect the variation of the capacitance signal, and then position coordinates of the finger touch are calculated. The smart terminal realizes interaction input between a person and the watch 100 by the capacitive touch screen sensor 2, and the display screen 4 realizes display output after interaction. Under the condition that water exists on the surface of the glass cover plate 1, the sensors in the transverse direction and the longitudinal direction on the capacitive touch screen sensor 2 respectively collect the variation of the capacitance signal. However, in this case, the variation amount of the capacitance signal is smaller compared with that of the capacitance signal under the condition that the finger touches the glass cover plate 1. Generally, in this case, the variation amount of the capacitance signal is not large enough to reach a set threshold for the capacitive touch screen to give an alarm, and thus no alarm is given. A circle of metal wire (or referred to as a ground wire or a metal ground wire) 5 as shown in FIG. 3 to FIG. 5 is mounted around the periphery of the glass cover plate 1 of the smart terminal, and the metal wire 5 is connected to a chip ground (or a grounding pin of the chip) of the capacitive touch screen chip 3 or a ground wire led out from the chip ground. A switch device capable of disconnecting and connecting the ground wire 5, such as a ground wire on/off switch 6 as shown in FIG. 5, is mounted on the capacitive touch screen chip 3, so as to achieve timed disconnecting and connecting of the ground wire 5.

Generally, under the condition that a water flow flows through the surface of the glass cover plate 1, the capacitive touch screen can collect variation in a capacitance signal, but this signal is still insufficient for determining whether it is water flowing through the surface of the glass cover plate 1. For example, under the condition that the finger is away from the glass cover plate 1, for example, under the condition that the finger is at a certain distance from the glass cover plate 1, the variation amount of the capacitance signal caused by the finger is close to the variation amount of the capacitance signal caused by the water drop, and in this case, it cannot be determined whether it is a water drop or a finger. Therefore, it is also necessary to make the water drop grounded, such that the variation amount of the capacitance signal generated by the water drop is sharply increased to be close to or the same as that under the condition that the finger touches the glass cover plate 1, so that it can be identified whether there is a water drop or a finger on the glass cover plate 1. The ground wire 5 is connected to the housing, and the ground wire 5 is connected to the capacitive touch screen chip 3. After the water is grounded, a capacitance signal collected by the capacitive touch screen becomes more obvious and intense. Under the condition that the water covers the surface of the capacitive touch screen, the changes of the capacitance signal under the condition that the water is grounded and under the condition that the water is not grounded are respectively in different capacitance ranges. Therefore, the presence of water on the surface of the screen can be determined by the variation of signal amount. In short, in some embodiments of the present disclosure, the ground wire is led out from the capacitive touch screen chip to the surface of the housing of the capacitive touch screen, and the ground wire led out from the capacitive touch screen chip to the surface of the housing of the capacitive touch screen is connected and disconnected, so as to identify a water ingress risk of the terminal.

Figure 6:
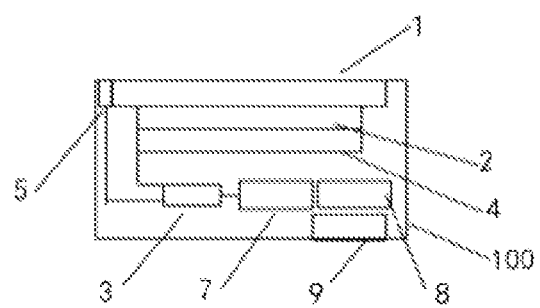
FIG. 6 is a fourth schematic structural diagram of a watch provided according to the embodiments of the present disclosure.

In order to prevent water from intruding into the interior of the terminal, the user needs to clean up water stains on the surface of the terminal in time. After determining the presence of water on the surface of the glass cover plate 1, the capacitive touch screen chip 3 sends a signal to a central processing unit 7, and the central processing unit 7 can allow for the user to clean up the water on the terminal in time by vibration of a motor 8, sound playback of a loudspeaker 9 or reminding caption display of the display screen 4, as shown in FIG. 6.

In some exemplary implementations, if the presence of water is identified based on the signal amount, the time when the presence of water is identified and the duration of the presence of water are recorded, and the longer the duration, the greater the water ingress risk. Meanwhile, the terminal may also upload the data to a cloud server, and the cloud server stores the time when there is water around the terminal and the duration of the presence of water.

In some exemplary implementations, under the condition that the presence of water is identified, if the terminal cannot recognize a fingerprint when performing operations such as fingerprint recognition, the terminal can display a prompt to remind the user to wipe off water on the surface of the display screen and then perform a fingerprint recognition operation. At the same time, the user can also be reminded to wipe off water on the surface of the touch screen, so as to improve the finger touch effect.

Figure 7:
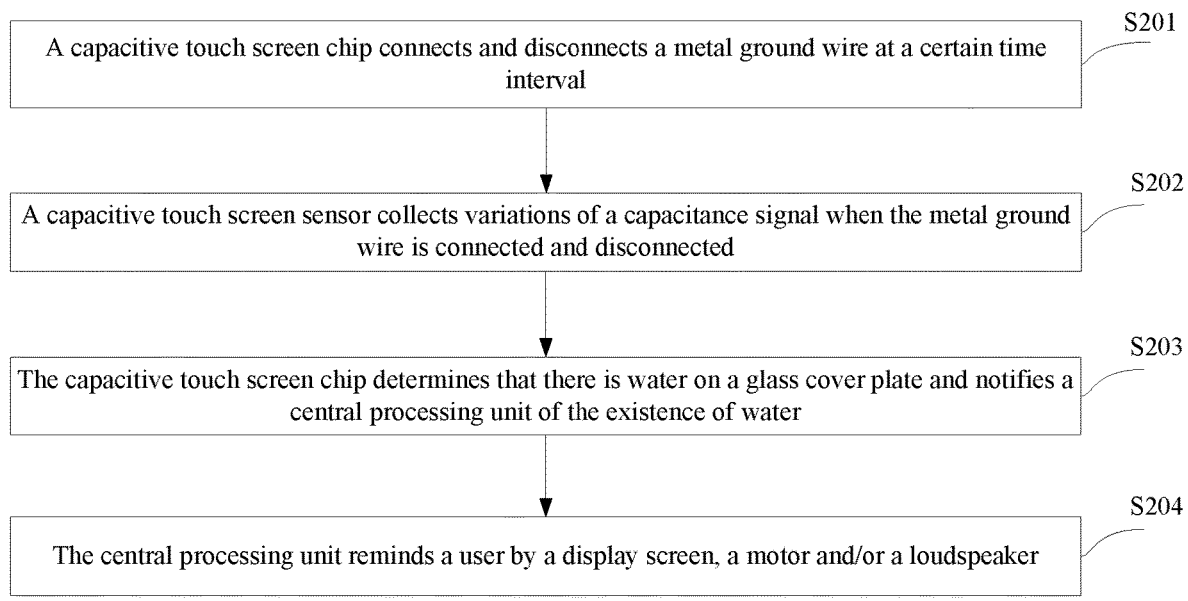
FIG. 7 is a flowchart that a watch identifies a water ingress risk of the watch according to the embodiments of the present disclosure.

FIG. 7 is a flowchart that a watch identifies a water ingress risk of the watch according to the embodiments of the present disclosure. As shown in FIG. 7, the following operations S201 to S204 may be included.

At operation S201, a switch device 6 is arranged in a capacitive touch screen chip 3 or on a side of the capacitive touch screen chip 3, one end of the switch device 6 is connected to a metal ground wire 5, and the other end of the switch device 6 is connected to a chip ground of the capacitive touch screen chip 3. Under the condition that the switch device 6 is closed, the metal ground wire 5 is connected to the chip ground; and under the condition that the switch device 6 is opened, the metal ground wire 5 is disconnected from the chip ground. The capacitive touch screen chip 3 controls to connect the metal ground wire 5 to the chip ground and disconnect the metal ground wire 5 from the chip ground once at a certain time interval.

At operation S202, during the connection of the metal ground wire 5 to the chip ground, under the condition that there is water on the surface of a glass cover plate 1, the water is connected to the metal ground wire 5. Since the metal ground wire 5 is connected to the chip ground, the variation amount of the capacitance signal collected by a capacitive touch screen sensor 2 is large, which is equivalent to the capacitance variation amount of finger touch (a threshold interval in this case is set as a first threshold interval), and the variation amount of the capacitance signal is in the first threshold interval. During the disconnection of the metal ground wire 5 from the chip ground, under the condition that there is water on the surface of the glass cover plate 1, the water is connected to the metal ground wire 5. Since the metal ground wire 5 is not connected to the chip ground, the variation amount of the capacitance signal collected by the capacitive touch screen sensor 2 is small, which is smaller compared with the capacitance variation amount of finger touch (a threshold interval in this case is set as a second threshold interval), and the variation amount of the capacitance signal is in the second threshold interval.

At operation S203, the capacitive touch screen chip 3 determines whether there is water on the glass cover plate 1 according to the variation amount of the capacitance signal collected by the capacitive touch screen sensor 2 under the condition that the metal ground wire 5 is in the two states of being connected to and disconnected from the chip ground. For example, under the condition that the variation amounts of the capacitance signal obtained respectively when the metal ground wire 5 is connected to and disconnected from the chip ground are both within the first threshold interval, it indicates that a finger touches the capacitive touch screen; and under the condition that the variation amounts of the capacitance signal obtained respectively when the metal ground wire 5 is connected to and disconnected from the chip ground are within different intervals, it indicates that there is water on the surface of the glass cover plate 1. In response to determining that there is water on the surface of the glass cover plate 1, a signal indicating the state of presence of water is sent to a central processing unit 7.

At operation S204, upon receiving the signal sent by the capacitive touch screen chip 3 that there is water on the glass cover plate 1, the central processing unit 7 reminds the user by a display screen 4, a motor 8, a loudspeaker 9, etc., for example, content reminding the user to wipe off water as soon as possible is displayed on the display screen 4, and the user is reminded to wipe off water as soon as possible by vibration of the motor 8 and playback of the loudspeaker 9. Moreover, the central processing unit 7 records the time of the presence of water and the duration of the presence of water.

According to the embodiments of the present disclosure, the ground wire is led out from the capacitive touch screen chip, and the ground wire is in a grounded state and a suspended non-grounded state by controlling the connection and disconnection of the ground wire, the lead-out ground wire is mounted and arranged on the surface of the housing of the smart terminal; and under the condition that a water drop covers the surface of the cover plate of the touch screen and the ground wire on the surface of the housing, if the touch screen detects that the variation amounts of the capacitance signal are different in the two situations, i.e. the grounded state and the suspended non-grounded state, it indicates that there is water on the surface of the touch screen. The touch screen identifies variation of the capacitance signal, identifies that water covers the surface of the cover plate, and finally determines the risk of water on a smart terminal such as a watch. The user is reminded, by means of display content, vibration or sound, to move the smart terminal such as a watch away from water, the time of ingress water and duration of ingress water are recorded, and the user can also be reminded to wipe off water on the surface of the screen, improving effects in terms of operation on the surface of the touch screen or fingerprint recognition, etc.

Figure 8:
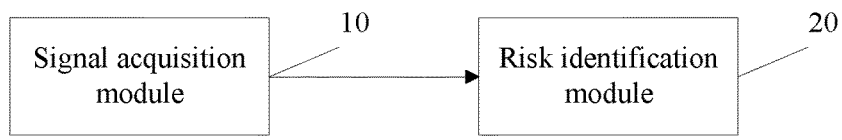
FIG. 8 is a structural block diagram of an apparatus for identifying a water ingress risk of a terminal provided according to the embodiments of the present disclosure.

FIG. 8 is a structural block diagram of an apparatus for identifying a water ingress risk of a terminal provided according to the embodiments of the present disclosure. As shown in FIG. 8, the apparatus may include a signal acquisition module 10 and a risk identification module 20.

The signal acquisition module 10 is configured to respectively acquire variation amounts of the capacitance signal of a capacitive touch screen of a smart terminal under the condition that a ground wire on the surface of a housing of the smart terminal is connected to and disconnected from a chip ground of a capacitive touch screen chip of the smart terminal.

The risk identification module 20 is configured to identify a water ingress risk of the smart terminal according to the acquired variation amounts of the capacitance signal.

The variation amount of the capacitance signal includes a first variation amount of the capacitance signal and a second variation amount of the capacitance signal.

For example, the signal acquisition module 10 controls the ground wire on the surface of the housing to be connected to the chip ground of the capacitive touch screen chip, and acquires a first variation amount of the capacitance signal of the capacitive touch screen under the condition that the ground wire on the surface of the housing is connected to the chip ground of the capacitive touch screen chip; and the signal acquisition module controls the ground wire on the surface of the housing to be disconnected from the capacitive touch screen chip, and acquires a second variation amount of the capacitance signal of the capacitive touch screen under the condition that the ground wire on the surface of the housing is disconnected from the capacitive touch screen chip. The risk identification module 20 determines whether the first variation amount of the capacitance signal is within a first threshold interval or a second threshold interval, and determines whether the second variation amount of the capacitance signal is within the first threshold interval or the second threshold interval; in response to determining that the first variation amount of the capacitance signal is within the first threshold interval and the second variation amount of the capacitance signal is within the second threshold interval, it is determined that the smart terminal has the water ingress risk; and in response to determining that the first variation amount of the capacitance signal and the second variation amount of the capacitance signal are both within the first threshold interval, it is determined that the smart terminal have no water ingress risk of the terminal. Variation amounts of the capacitance signal within the first threshold interval are all greater than variation amounts of the capacitance signal within the second threshold interval.

In some exemplary implementations, the apparatus may further include: a reminding module, configured to give an alarm under the condition that the smart terminal has the water ingress risk, to remind the user to perform at least one of wiping off the water on the surface of the housing and moving the smart terminal away from the water source, for example, giving an alarm by means of vibration, ringing, voice broadcast, screen display, etc.

In some exemplary implementations, the apparatus may further include: a storage module, configured to record an occurrence time of the water ingress risk of the smart terminal and identify a duration when the smart terminal is in an environment with water under the condition that the smart terminal has the water ingress risk.

In some exemplary implementations, the apparatus may further include: a communication module, configured to send, to a cloud server, the recorded occurrence time and duration of the water ingress risk of the smart terminal, and store, by the cloud server, the occurrence time and duration of the water ingress risk of the smart terminal.

The apparatus in the embodiments may be applied to a smart terminal having a capacitive touch screen, such as a watch and a mobile phone. Generally, under the condition that a water flow flows through the surface of the display screen of the smart terminal, the capacitive touch screen can collect variation in the capacitance signal, but this signal is still insufficient for determining whether it is water. The ground wire on the surface of the housing is connected to the housing, and the ground wire on the surface of the housing is connected to the capacitive touch screen chip; after the water is grounded, a capacitance signal collected by the capacitive touch screen becomes more obvious and intense. That is to say, under the condition that water covers the surface of the capacitive touch screen, the variations of the capacitance signal under the condition that the water on the surface of the capacitive touch screen is grounded and not grounded are collected; and by the signal variation amounts, it can be determined whether there is water on the surface of the screen. i.e. under the condition that the two variation amounts are respectively in different capacitance intervals, it can be determined that there is water on the surface of the screen. In order to prevent water from intruding into the interior of the terminal, in response to determining that there is water on the surface of the screen, the user can be reminded, by means of vibration of a motor, sound playback or reminding caption display of the display screen, to clean up water stains on the surface of the terminal such as a watch in time, thereby reducing the water ingress risk of the terminal. In addition, the user can also be reminded that after the water is wiped off, devices such as a fingerprint device can be in a better working state, the service life of the product itself is prolonged, and the competitiveness of the product is improved, which is a competitive advantage of terminal products.

The embodiments of the present disclosure further provide a device for identifying a water ingress risk of a terminal, the device including a memory and a processor; wherein the memory stores a program running on the processor, and the processor is configured to implement the operations of the method for identifying the water ingress risk of the terminal when executing the program. The processor may be a central processing unit, a digital signal processor, a microprocessor, or the like, and the memory may be a storage medium, such as a Random Access Memory (RAM), a Read-Only Memory (ROM), an Electrically Erasable Programmable Read-Only Memory (EEPROM), a flash memory, or the like, which can be used to store desired information and can be accessed by the processor.

The device in the embodiments may be applied to a smart terminal having a capacitive touch screen, such as a watch and a mobile phone. By using existing components of a terminal such as a watch, and based on variation amounts of the capacitance signal collected by the capacitive touch screen under the condition that water is grounded or not grounded, it may be determined whether there is water from a different aspect; if the presence of water is identified by the variation amounts of the capacitance signal, the time when the presence of water is identified and the duration of the presence of water are recorded, and the longer the duration, the greater the water ingress risk. Under the condition that the presence of water is identified and operations such as fingerprint recognition is performed, if a fingerprint cannot be identified, the user may be reminded, in a display manner, to wipe off water on the surface of the display screen and then perform a fingerprint recognition operation.

The embodiments of the present disclosure are applied to a scenario in which the capacitive touch screen identifies the presence of water, and devices on a smart terminal such as a watch are used to remind a user (such as a child), so that the user (such as a child) can enhance the awareness of protecting the smart terminal such as a watch from being damaged by water, and also can remind the user (such as a child) to wipe off water stains on the watch, thereby protecting the terminal such as a watch from being damaged by water.

The embodiments of the present disclosure further provide a storage medium, the storage medium storing one or more programs; wherein the one or more programs, when being executed by a processor, cause the processor to implement the operations of the method for identifying the water ingress risk of the terminal. The storage medium includes but is not limited to, an RAM, an ROM, an EEPROM, a flash memory or other memory technology, a Copy Download-ROM (CD-ROM), a Digital Versatile Disk (DVD) or other optical disk storage, magnetic cassettes, magnetic tapes, magnetic disk storage or other magnetic storage apparatuses, or any other medium which can be used to store desired information and can be accessed by a computer.

In conclusion, by using the method, apparatus and device for identifying a water ingress risk of a terminal, and the storage medium provided according to the embodiments of the present disclosure, a first variation amount of a capacitance signal of a capacitive touch screen caused by connection between a ground wire on the surface of a housing of a smart terminal and a chip ground of a capacitive touch screen chip of the smart terminal, and a second variation amount of the capacitance signal of the capacitive touch screen caused by disconnection between the ground wire on the surface of the housing and the chip ground of the capacitive touch screen chip can be respectively acquired; and a water ingress risk of the smart terminal can be identified according to the acquired first variation amount of the capacitance signal and the acquired second variation amount of the capacitance signal. Hence, the technical solution provided in the embodiments of the present disclosure can allow for identifying a water ingress risk of the smart terminal without increasing the design and assembly difficulty of the smart terminal, so that the user moves the smart terminal away from an environment with water as soon as possible, thereby reducing the water ingress risk of the smart terminal.

The content above illustrate exemplary embodiments of the present disclosure with reference to the accompanying drawings, which are thus not intended to limit the claimed scope of the present disclosure. Any modifications, equivalent replacements, and improvements made by a person having ordinary skill in the art without departing from the scope and principle of the present disclosure shall all belong to the claimed scope of the present disclosure.

What is claimed is:

1. A method for identifying a water ingress risk of a smart terminal, comprising:
   acquiring a first variation amount of a capacitance signal of a capacitive touch screen caused by connection between a ground wire provided along an edge of a glass cover plate on an outer surface of a housing of the smart terminal and a chip ground of a capacitive touch screen chip of the smart terminal;
   acquiring a second variation amount of the capacitance signal of the capacitive touch screen caused by disconnection between the ground wire provided along the edge of the glass cover plate on the outer surface of the housing and the chip ground of the capacitive touch screen chip;
   comparing the acquired first variation amount of the capacitance signal and the acquired second variation amount of the capacitance signal with at least one of a first capacitance interval or a second capacitance interval;
   in response to determining that both the first variation amount of the capacitance signal and the second variation amount of the capacitance signal are within the first capacitance interval:
   determining that there is no water on an outer surface of the capacitive touch screen, and
   determining that there is no water ingress risk of the smart terminal; and
   in response to determining that the first variation amount of the capacitance signal is within the first capacitance interval and the second variation amount of the capacitance signal is within the second capacitance interval:
   determining presence of water on the outer surface of the capacitive touch screen,
   determining the water ingress risk of the smart terminal, and
   determining an occurrence time and a duration of the water ingress risk,
   wherein a variation amount of the capacitance signal within the first capacitance interval is greater than the variation amount of the capacitance signal within the second capacitance interval.

2. The method according to claim 1, wherein the ground wire on the outer surface of the housing is connected to and disconnected from the chip ground of the capacitive touch screen chip within a preset time interval.

3. The method according to claim 1, further comprising:
   under a condition that the smart terminal has the water ingress risk, giving an alarm to remind a user to wipe off water on the outer surface of the housing and/or move the smart terminal away from a water source.

4. The method according to claim 3, wherein giving the alarm to remind the user to wipe off water on the outer surface of the housing and/or move the smart terminal away from the water source comprises:
   sending the alarm to other devices capable of communicating with the smart terminal by means of vibration, ringing, voice broadcast, or screen display, so as to remind the user to wipe off water on the outer surface of the housing or move the smart terminal away from the water source.

5. A non-transitory storage medium, the storage medium storing one or more programs; wherein the one or more programs, when being executed by a processor, cause the processor to implement one or more operations of the method for identifying the water ingress risk of the smart terminal according to claim 1.

6. The method according to claim 1, wherein the chip ground of the capacitive touch screen chip is a grounding pin of the capacitive touch screen chip, or is a grounding wire led out from a grounding pin of the capacitive touch screen chip.

7. The method according to claim 1, further comprising:
   under a condition that the smart terminal has the water ingress risk, uploading the occurrence time and the duration of the water ingress risk of the smart terminal to a cloud server.

8. The method according to claim 1, wherein the ground wire on the outer surface of the housing is a closed or non-closed ground wire.

9. A device for identifying a water ingress risk of a smart terminal, the device comprising a memory and a processor;
   wherein the memory stores a program running on the processor, and the processor is configured to implement following operations when executing the program:
   acquiring a first variation amount of a capacitance signal of a capacitive touch screen caused by connection between a ground wire provided along an edge of a glass cover plate on an outer surface of a housing of the smart terminal and a chip ground of a capacitive touch screen chip of the smart terminal,
   acquiring a second variation amount of the capacitance signal of the capacitive touch screen caused by disconnection between the ground wire provided along the edge of the glass cover plate on the outer surface of the housing and the chip ground of the capacitive touch screen chip, comparing the acquired first variation amount of the capacitance signal and the acquired second variation amount of the capacitance signal with at least one of a first capacitance interval or a second capacitance interval;

in response to determining that both the first variation amount of the capacitance signal and the second variation amount of the capacitance signal are within the first capacitance interval:

determining that there is no water on an outer surface of the capacitive touch screen, and determining that there is no water ingress risk of the smart terminal; and in response to determining that the first variation amount of the capacitance signal is within the first capacitance interval and the second variation amount of the capacitance signal is within the second capacitance interval: determining presence water on the outer surface of the capacitive touch screen, determining the water ingress risk of the smart terminal, and determining an occurrence time and a duration of the water ingress risk, wherein a variation amount of the capacitance signal within the first capacitance interval is greater than the variation amount of the capacitance signal within the second capacitance interval.

10. A smart terminal, comprising: a housing, a capacitive touch screen sensor, a capacitive touch screen chip, and a capacitive touch screen, wherein a ground wire is mounted along an edge of a glass cover plate on an outer surface of the housing of the smart terminal, and is connected to a chip ground of the capacitive touch screen chip through a switch device, wherein the switch device is used for controlling connection of the ground wire to the chip ground of the capacitive touch screen chip or disconnection of the ground wire from the chip ground of the capacitive touch screen chip;

the capacitive touch screen sensor is mounted above the capacitive touch screen, and is used for respectively acquiring a first variation amount of a capacitance signal of the capacitive touch screen caused by connection between the ground wire on the outer surface of the housing of the smart terminal and the chip ground of the capacitive touch screen chip of the smart terminal, and a second variation amount of the capacitance signal of the capacitive touch screen caused by disconnection between the ground wire on the outer surface of the housing and the chip ground of the capacitive touch screen chip; and the capacitive touch screen chip is configured to:

compare the acquired first variation amount of the capacitance signal and the acquired second variation amount of the capacitance signal with at least one of a first capacitance interval or a second capacitance interval, in response to determining that both the first variation amount of the capacitance signal and the second variation amount of the capacitance signal are within the first capacitance interval: determining that there is no water on an outer surface of the capacitive touch screen, and determining that there is no water ingress risk of the smart terminal; and in response to determining that the first variation amount of the capacitance signal is within the first capacitance interval and the second variation amount of the capacitance signal is within the second capacitance interval: determining presence water on the outer surface of the capacitive touch screen, determining the water ingress risk of the smart terminal, and determining an occurrence time and a duration of the water ingress risk, wherein a variation amount of the capacitance signal within the first capacitance interval is greater than the variation amount of the capacitance signal within the second capacitance interval.

11. The smart terminal according to claim 10, wherein the ground wire on the outer surface of the housing is a closed or non-closed ground wire.

12. The smart terminal according to claim 10, wherein the chip ground of the capacitive touch screen chip is a grounding pin of the capacitive touch screen chip, or is a grounding wire led out from a grounding pin of the capacitive touch screen chip.

13. The smart terminal according to claim 10, wherein the smart terminal further comprises a processor, and under a condition of determining that the smart terminal has the water ingress risk, the capacitive touch screen chip sends a signal to the processor, and the processor gives an alarm to remind a user to wipe off water on the surface of the housing and/or move the smart terminal away from a water source.

* * * * *